Figure 1:
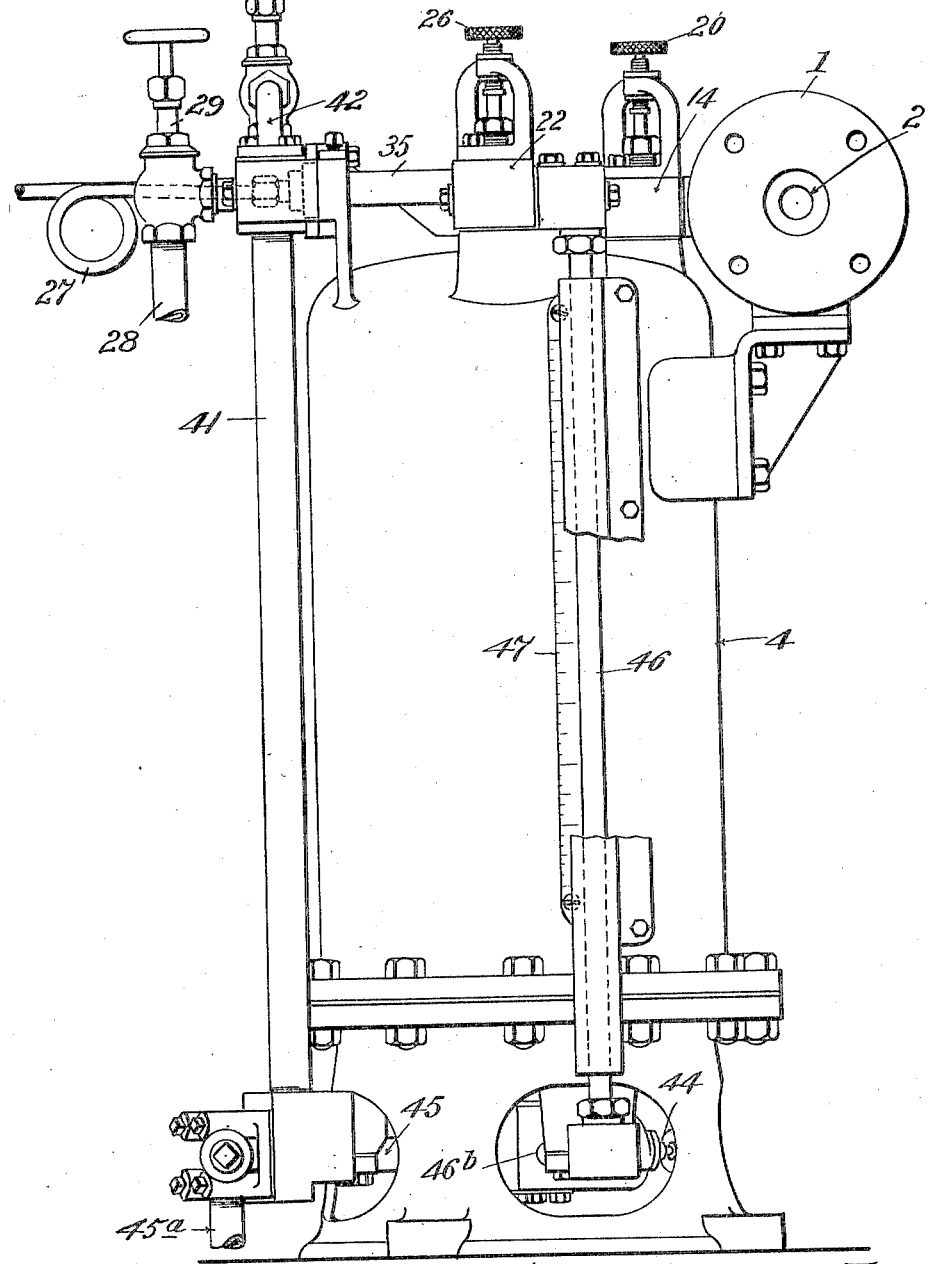

J. E. WILLIAMSON & R. E. MILLIGAN.
MECHANISM FOR COMBINING FLUIDS.
APPLICATION FILED MAR. 30, 1916.

1,291,329.

Patented Jan. 14, 1919.
5 SHEETS—SHEET 1.

J. E. WILLIAMSON & R. E. MILLIGAN.
MECHANISM FOR COMBINING FLUIDS.
APPLICATION FILED MAR. 30, 1916.
1,291,329.
Patented Jan. 14, 1919.
5 SHEETS—SHEET 2.
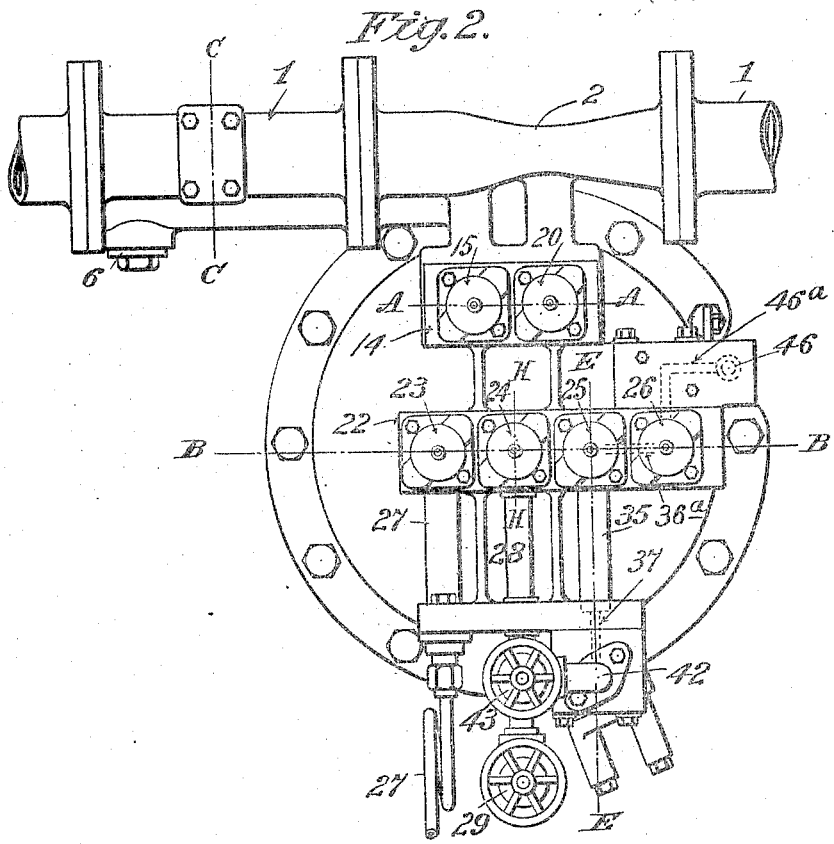
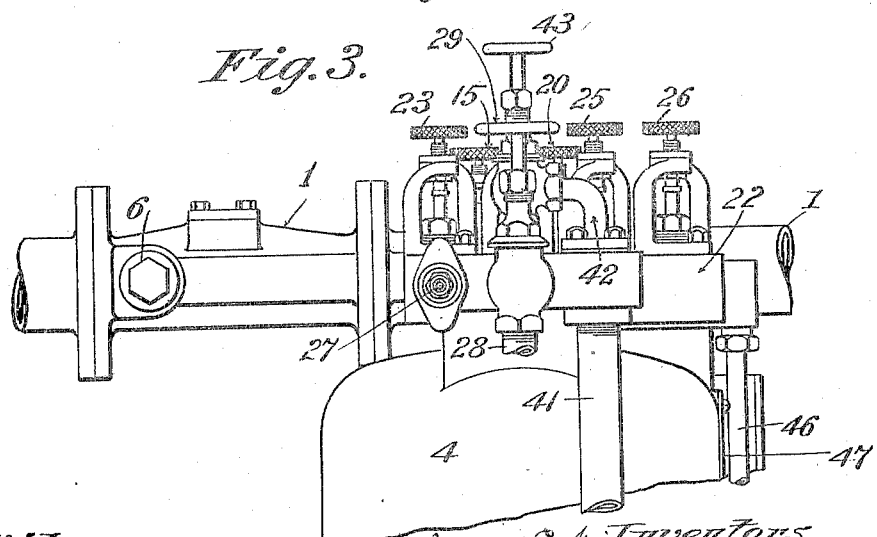

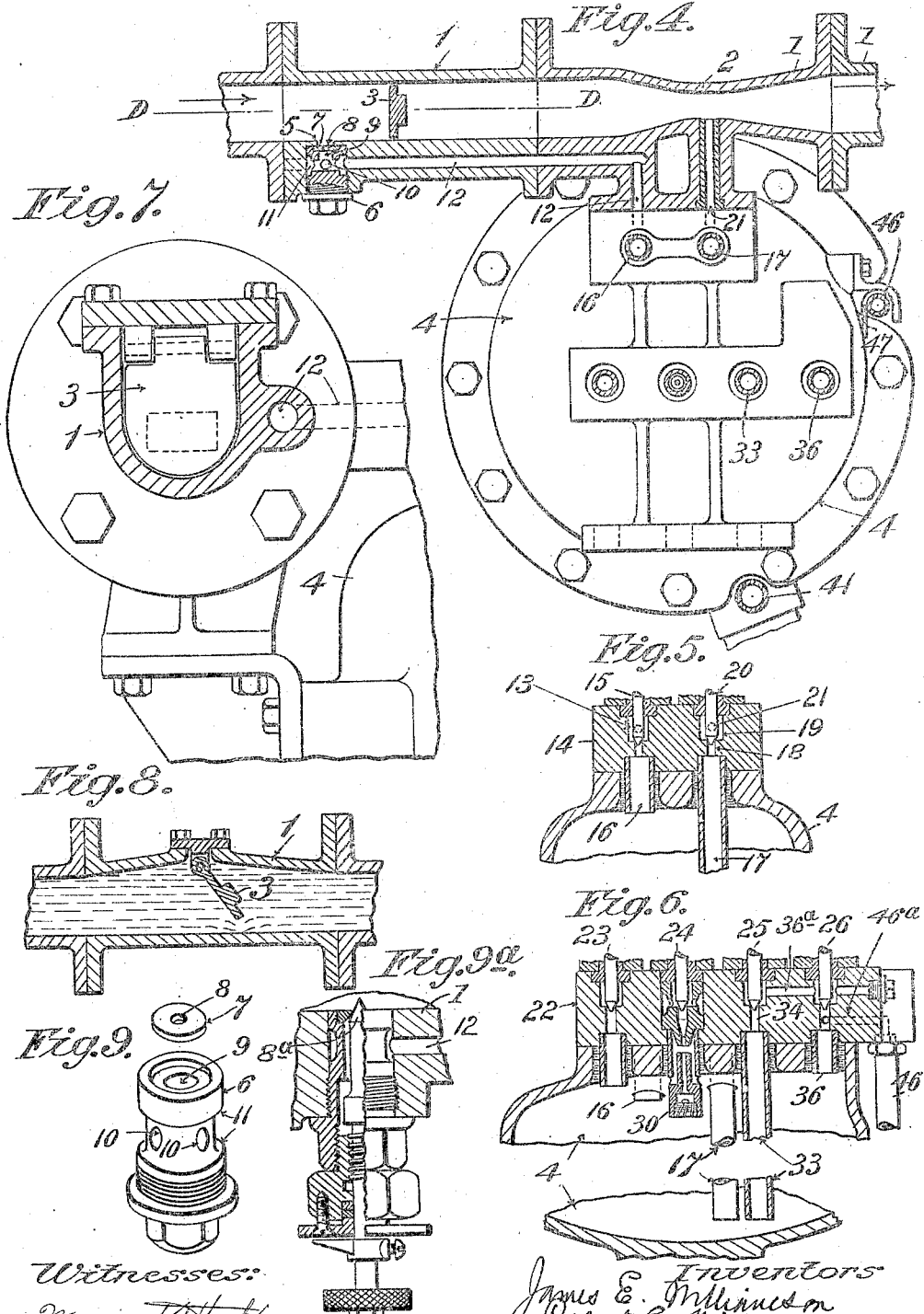

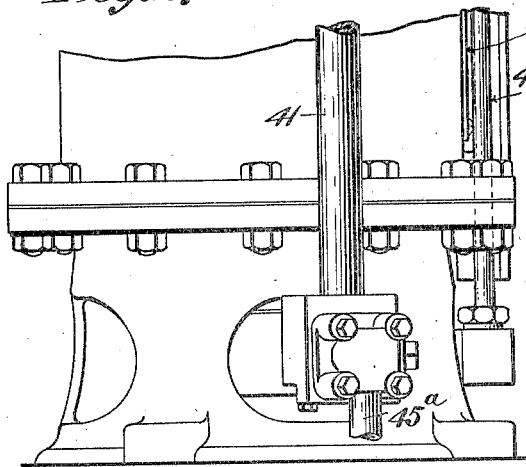
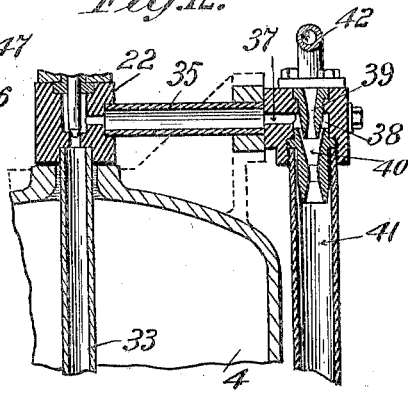
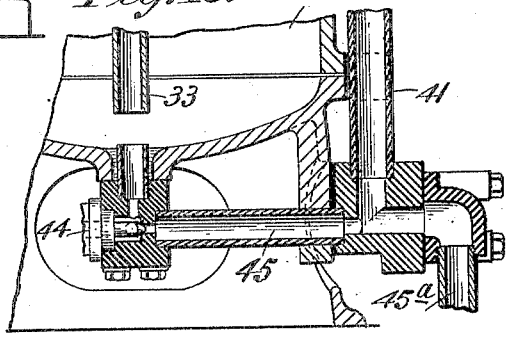
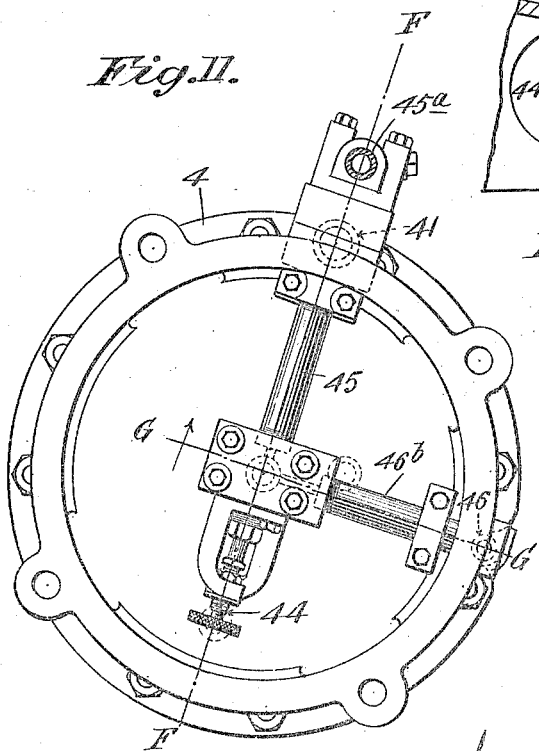
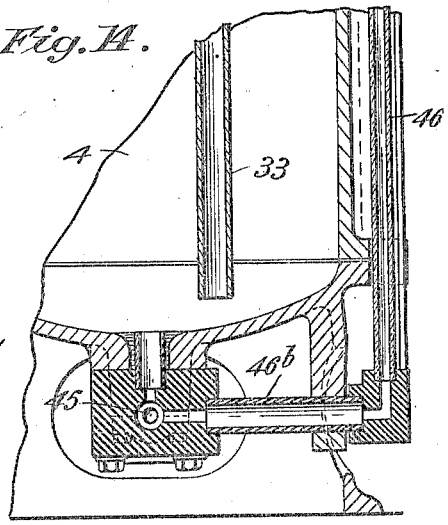

J. E. WILLIAMSON & R. E. MILLIGAN.
MECHANISM FOR COMBINING FLUIDS.
APPLICATION FILED MAR. 30, 1916.
1,291,329.
Patented Jan. 14, 1919.
5 SHEETS—SHEET 5.
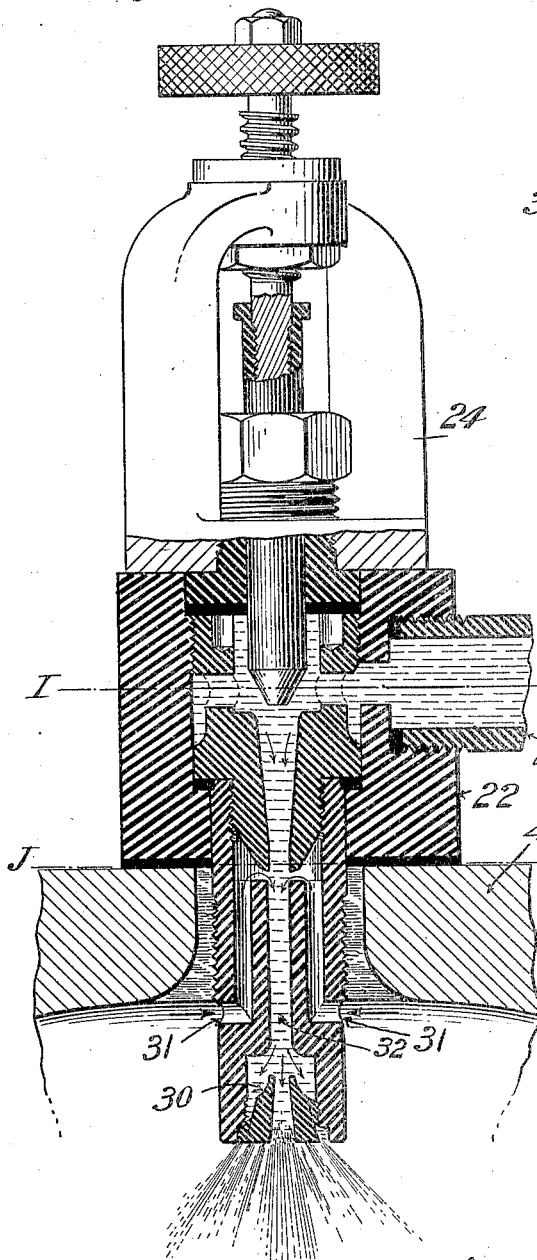
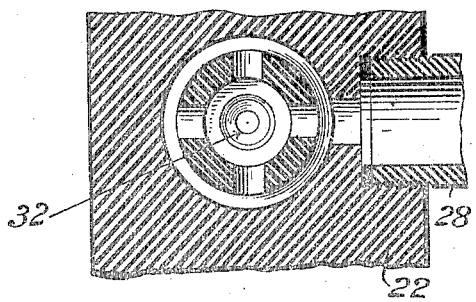
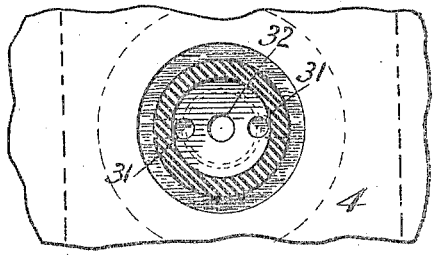
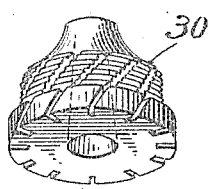
Witnesses:
Margaret A. Heck
Benjamin T. Abrams
Inventors
James E. Williamson
Robert E. Milligan
by Henry M. Bingham
their Attorney

UNITED STATES PATENT OFFICE.

JAMES E. WILLIAMSON, OF SOUTH ORANGE, NEW JERSEY, AND ROBERT E. MILLIGAN, OF MOUNT WASHINGTON, MASSACHUSETTS.

MECHANISM FOR COMBINING FLUIDS.

1,291,329.          Specification of Letters Patent.       Patented Jan. 14, 1919.

Application filed March 30, 1916. Serial No. 87,839.

*To all whom it may concern:*

Be it known that we, JAMES E. WILLIAMSON, a citizen of the United States, residing at South Orange, in the county of Essex and State of New Jersey, and ROBERT E. MILLIGAN, a citizen of the United States, residing at Mount Washington, in the county of Berkshire and Commonwealth of Massachusetts, have invented certain new and useful Improvements in Mechanism for Combining Fluids, of which the following is a specification.

Our invention is designed primarily for impregnating flowing water with a coagulating or sterilizing solution, or other reagents, introduced in quantities bearing a certain predetermined ratio to the flow of the water and means for varying such predetermined ratio. The apparatus is designed to supply the proper ratio of reagent to a fluid, the flow of which varies from time to time during the operation of the apparatus. Other objects of our invention are to provide means whereby the tank which contains the reagent may be readily and accurately recharged; also to provide means whereby the contents of said tank may be discharged and, where such reagent is volatile, for supplying to the reagent discharged from such tank such an additional quantity of water or other fluid as will prevent excessive or undue escape of such gas into the atmosphere; also to provide means for causing an initial difference in the pressure or head tending to force the water or other fluid to be treated, through the conduit, and to utilize such difference in head to compel the flow of the reagent into the conduit through which the water or fluid to be treated flows.

These and the other objects of our invention will more fully appear in the following specification and claims, and in the accompanying drawings in illustration thereof.

In the drawings, Figure 1 is an elevation of the preferred form of our apparatus. Fig. 2 is a plan view of our apparatus. Fig. 3 is an elevation, partly broken away, of the upper portion of our apparatus viewed at right angles to the view shown in Fig. 1. Fig. 4 is a plan view of our apparatus, partly in section. Fig. 5 is a detailed view of our apparatus, partly in section and partly broken away, on the line A—A of Fig. 2. Fig. 6 is an elevation, partly in section and partly broken away, on the line B—B of Fig. 2. Fig. 7 is a cross section on the line C—C of Fig. 2. Fig. 8 is a section on the line D—D of Fig. 4. Fig. 9 is an enlarged perspective view of the hollow plug and orifice disk. Fig. 9$^a$ is an enlarged sectional view of an adjustable valve that may be employed in lieu of the hollow plug and orifice disk shown in Fig. 9. Fig. 10 is an elevation of the lower portion of the apparatus showing a portion of the gage glass and the discharge pipe. Fig. 11 is an inverted base view in plan, of our apparatus. Fig. 12 is a detailed section on the line E—E of Fig. 2. Fig. 13 is a detailed section on the line F—F of Fig. 11. Fig. 14 is a detailed elevation in section on the line G—G of Fig. 11. Fig. 15 is an elevational view, partly in section, on the line H—H of Fig. 2. Fig. 16 is a horizontal section on the line I—I of Fig. 15. Fig. 17 is a horizontal section on the line J—J of Fig. 15. Fig. 18 is an enlarged perspective view of the distributing nozzle through which liquid is introduced into the solution tank.

Similar numerals are used to designate similar parts throughout the accompanying drawings.

The preferred form of our apparatus as illustrated, is designed primarily to introduce into water flowing through a conduit 1 a sterilizing solution, preferably water charged with chlorin gas. It is apparent, however, that other solutions or reagents, may be used and that other fluids than water may be treated.

The conduit 1, through which the water or other fluid to be treated, flows, is provided with a contracted section 2. Also mounted in the conduit 1 is a hinged curtain valve 3. The coagulating, sterilizing or other solution which it is desired to feed to the water or other fluid passing through the conduit 1, is contained in a tank 4. The conduit 1 is tapped at 5 for the introduction of a plug 6, which is provided with a recess in its inner end, in which is secured a disk 7, provided with an orifice 8, of suitable size to regulate the flow of solution from the tank 4 to the conduit 1. It is apparent that the ratio of flow from the solution tank, as compared with the flow through the conduit 1, may be readily changed by substituting a disk 7 having a larger or smaller orifice 8. In Fig. 9$^a$ we have shown the plug 6 provided with a needle valve 8ª, adapted to regulate the effective area of the discharge orifice in this plug. We prefer this modification where frequent changes are necessary in the ratio between the reagent supplied and the fluid flowing through the conduit 1.

A portion of the fluid flowing through the conduit 1 passes through the orifice 8, through the passage 9 in the plug 6, and through the lateral passages 10 and into the annual space formed by cutting away the central portion of the plug 6 at 11; and thence through the passage 12 into the chamber 13 in the valve block 14, past the valve 15 and through the pipe 16 into the solution tank 4.

Mounted in the valve block 14 is a pipe 17, which extends downwardly into the tank 4 to a point near the bottom thereof, as shown in Fig. 6. A passage 18 communicates between the pipe 17 and the chamber 19 in the valve block 14. A valve 20, mounted in the block 14, is adapted to close the upper end of the passage 18. Communicating with the chamber 19 is a passage 21, which completes the communication between the pipe 17 and the conduit 1.

Mounted in the head of the tank 4 is a multiple valve block 22, provided with a valve 23 for controlling the flow of gas into the tank, a valve 24 for controlling the flow of water or other fluid into the tank, a valve 25 adapted to permit a portion of the contents of the tank to be discharged, and a valve 26 adapted to release any air or gas trapped in the upper portion of the tank 4. When the valve 23 is opened, the gas is supplied to the tank 4 from any suitable source through the pipe 27. Liquid may be supplied to the tank 4 from any suitable source through the pipe 28, by opening the valve 24 and the valve 29. The purpose of the valve 29, which is of the ordinary type, is to cut off the flow of water, from the pipe 28, to the apparatus, and it has no other function. The water passes downward into the tank 4 through the spray nozzle 30. Passages 31 communicate with the passage 32, through the nozzle 30 and also with the upper portion of the tank 4. 33 is a pipe extending down into the tank 4 to a point near the bottom thereof, and communicating with the passage 34 controlled by the valve 25 and discharging into the pipe 35. 36 is a passage communicating with the upper portion of the tank 4, and with the passage 36ª, which in turn communicates with the pipe 35. The passage 36 is adapted to be closed by the valve 26.

The pipe 35 discharges through a passage 37, into a chamber 38, from whence it passes around the nozzle 39, into the mixing chamber 40, and through the restricted throat of the chamber 40 into the waste pipe 41, which discharges into the drain pipe 45ª. Water or other suitable liquid is supplied to the nozzle 39 through the pipe 42, controlled by the valve 43.

The bottom of the tank 4 is provided with a drain valve 44, which, when opened, permits the liquid in the tank 4 to be discharged through the pipe 45 into the drain pipe 45ª for the purpose of draining the tank of solution when desired. The tank 4 is preferably provided with a gage glass 46, which is in open communication with both the top and bottom of the tank 4, through the passages 46ª and 46ᵇ respectively, as shown in Figs. 6 and 14. Mounted on the tank, adjacent to such gage glass 46, is a scale 47 having any desired form of graduation.

In the accompanying drawings and in the foregoing specification we have described the preferred form of our apparatus, designed for the purpose of treating water with a coagulating or sterilizing solution. It is apparent, however, that any fluid may be treated with any fluid reagent and that our apparatus may be modified to adapt it to treat any desired fluid with any desired reagent without departing from the spirit of our invention.

The operation of our preferred form of mechanism as described and shown, is as follows:

The tank 4 is first filled with water, by opening the valve 24 and the auxiliary valve 29, the valve 26 being also opened, to permit the air to escape through the waste pipe 41. When the tank has been filled, the valves 26 and 24 are closed. Then the predetermined charge of gas is introduced into the tank 4 through the pipe 27, by opening the valves 23 and 25. The amount of gas which is introduced is indicated by the depression of the liquid in the gage glass 46, and when the predetermined amount of gas has been introduced, as indicated by the height of the liquid in the gage glass 46, which may be accurately determined by the scale 47, the valves 23 and 25 are closed. Next the valve 24 is opened, introducing water which enters the tank 4 in a finely divided spray, through the spray nozzle 30. The introduction of the water in this manner quickly absorbs the gas as the water fills the tank. To further facilitate the rapid absorption of the gas by the incoming water, passages 31 are provided, which permit the gas to be drawn through these passages and intermingle with the water in the passage 32, and as it is ejected from the spray nozzle 30. By this mechanism practically all the gas introduced into the tank 4 is absorbed by the volume of water required to displace it in the tank as the water is introduced. When the tank 4 is filled with water, as evidenced by the rise of the column in the gage glass, the valve 26 is opened for a brief period, to permit the dislodgment or discharge of any gas entrapped in the upper passages 36 and 36ª, or in the passage 46ª communicating between the tank 4 and the upper end of the gage glass 46. When such gas, if any, has been driven out, the valves 26 and 24 are closed. When the tank is so charged, the valves 14 and 20 are opened, establishing communication with the water or liquid in the conduit 1. While the tank 4 is being recharged, the flow through the conduit 1 may be stopped or the tank 4 with its appliances may be duplicated and the additional tank thrown into operation, so that the flow through the conduit and the treatment of the fluid flowing therethrough may not be interrupted.

Due to the form of the conduit 1 when the water is flowing through it, a difference in pressure is established at the restricted portion 2 and at the point where the orifice 8 communicates with the conduit 1, which causes a flow of liquid from the conduit 1 through the orifice 8 and the passages 9, 10, 11, 12 and 16 into the tank 4, and causes the liquid contained in the tank to flow through the pipe 17, passage 18, chamber 19 and passage 21 into the conduit 1 at the restricted portion 2, in quantities which bear a substantially direct ratio to the quantity of liquid flowing through the conduit 1.

We have found in practice, however, that when the flow of liquid through the pipe 1 has been reduced beyond a certain point, the difference in head is not sufficient to cause a proportionate flow of solution from the tank 4, and in order to obviate this difficulty and to increase the accurate proportional feeding range of our apparatus, we have provided the curtain valve 3, which must be lifted by the liquid flowing through the conduit 1, and which thus established an initial differential pressure sufficient to cause the liquid to flow from the tank 4, and which supplements the normal differential due to the restricted section 2. The increase in the differential caused by the curtain valve 3, however, becomes negligible when any considerable quantity of fluid is flowing through the conduit 1. By this means we are able to maintain a substantially accurate proportional flow from the tank 4 when the flow through the conduit 1 is sufficient to operate the valve 3.

We claim:

1. Mechanism for combining fluids, comprising in combination a source of supply and a conduit for conducting the fluid to be treated, means for causing a differential pressure in the fluid flowing through said conduit, a reagent tank and means actuated by the differential pressure in said conduit adapted to cause the reagent in said tank to flow from said tank into said conduit and mingle with the fluid contained therein in a predetermined ratio, and independent means for establishing an initial differential pressure in said conduit sufficient to cause the reagent contained in the tank to flow from the tank into said conduit.

2. Mechanism for combining fluids comprising in combination a source of supply, a conduit for conducting the fluid, means for causing a differential pressure in the liquid flowing through said conduit, independent means for establishing an initial differential pressure in the liquid flowing through said conduit, a second source of supply, a second conduit leading from said first mentioned conduit to said second source of supply, a third conduit leading from said second source of supply to said first mentioned conduit, constituting means for causing the fluid to flow from said second source of supply and mingle with the fluid in said first mentioned conduit.

Signed at New York city, in the county of New York and State of New York, this 27th day of March, 1916.

JAMES E. WILLIAMSON.
ROBERT E. MILLIGAN.

Witnesses:
 MARGARET A. HECK,
 BENJAMIN T. ABRAMS.